US005618378A

United States Patent [19]

Cahill

[11] Patent Number: 5,618,378

[45] Date of Patent: Apr. 8, 1997

[54] APPARATUS FOR APPLYING IMAGES, PARTICULARLY SECURITY IMAGES TO BANKNOTES

[75] Inventor: Michal J. Cahill, Coventry, England

[73] Assignee: Molins PLC, London, England

[21] Appl. No.: 650,597

[22] Filed: Feb. 5, 1991

[30] Foreign Application Priority Data

| | | | |
|---|---|---|---|
| Feb. 5, 1990 | [GB] | United Kingdom | 9002519 |
| Apr. 20, 1990 | [GB] | United Kingdom | 9008928 |
| Nov. 13, 1990 | [GB] | United Kingdom | 9024631 |

[51] Int. Cl.$^{6}$ .................... B32B 31/04

[52] U.S. Cl. .................... 156/552; 156/358; 156/538; 156/540; 156/542; 355/55

[58] Field of Search .................... 156/240, 355, 156/358, 288, 264, 275.1, 275.7, 540, 552, 555, 542, 538; 355/55; 346/153.1

[56] References Cited

U.S. PATENT DOCUMENTS

| | | | |
|---|---|---|---|
| 2,628,929 | 2/1953 | Persoon et al. | 156/540 |
| 2,981,432 | 4/1961 | Flood et al. . | |
| 3,415,706 | 12/1968 | Ettre | 156/540 |
| 3,970,506 | 7/1976 | Kwan et al. | 156/542 |
| 4,188,252 | 2/1980 | Brown | 156/361 |
| 4,294,644 | 10/1981 | Anderson | 156/361 |
| 4,350,555 | 9/1982 | Popoff | 156/540 |
| 4,488,925 | 12/1984 | Craig et al. . | |
| 4,617,080 | 10/1986 | Kobayashi et al. | 156/542 |
| 4,639,287 | 1/1987 | Sakura | 156/542 |
| 4,650,536 | 3/1987 | Ceraso | 156/555 |
| 4,783,234 | 11/1988 | Simonton | 156/555 |
| 4,789,420 | 12/1988 | Lamanna et al. | 156/540 |
| 4,842,660 | 6/1989 | Voltmer et al. | 156/361 |
| 4,867,833 | 9/1989 | McCoy | 256/542 |
| 4,909,870 | 3/1990 | Gould et al. | 156/555 |
| 4,919,738 | 4/1990 | Ball et al. | 156/555 |
| 4,961,090 | 10/1990 | Gray, Jr. et al. | 355/55 |
| 5,043,749 | 8/1991 | Punater et al. | 346/153.1 |
| 5,143,576 | 9/1992 | Logan | 156/250 |
| 5,186,779 | 2/1993 | Tubbs . | |

*Primary Examiner*—Merrick Dixon
*Attorney, Agent, or Firm*—Antonelli, Terry, Stout & Kraus, LLP

[57] ABSTRACT

A security or other image, for example a hologram, is applied to a moving stock, e.g. banknote sheets, by carrying the images in the form of transfers on a web which is moved at the same speed as the stock during application but at a lower speed between application steps, so as to allow relatively close spacing of the images on the web. The web is retracted following each application to compensate for distance travelled during acceleration and deceleration during each cycle. The images are transferred by pressure cylinders which press the images on to adhesive patches provided on the stock at predetermined positions by applicator rolls.

28 Claims, 4 Drawing Sheets

APPARATUS FOR APPLYING IMAGES, PARTICULARLY SECURITY IMAGES TO BANKNOTES

This invention relates to an image applying method and apparatus. The invention finds particular but not exclusive use in a method of applying security images to banknotes.

It is known to incorporate a holographic image, usually carried in the form of a thin film of material, in credit cards in order to make counterfeiting more difficult. Use of such images in banknotes, for the same purpose, has also been proposed. In one aspect the present invention is intended for use in application of holographic images.

According to one aspect the invention provides a method of applying a series of images to a moving stock, including the steps of conveying the images on a carrier, the images having corresponding portions at a first spacing on the carrier, transferring the images from the carrier to predetermined positions on the moving stock, the images having corresponding portions at a second spacing on the stock, said second spacing being greater than said first spacing, and moving the carrier at the same speed as the stock during transfer but at a lower speed between transferring steps, so as to reduce net travel of the carrier between transferring steps. In a preferred embodiment the invention provides a printing process in which an image, particularly a security image, is applied to a moving stock, the carrier being in the form of a web carrying the images. In effect the method may achieve a reduction in consumption of the web. The series of images carried by the web may comprise discrete images or a continuous image (which becomes separated on transfer to the stock).

Preferably the web is accelerated from rest up to the speed of the stock and decelerated back to rest between each application. In order to allow use without waste of very close (i.e. substantially adjacent or continuous) images on the web it is necessary to compensate for the distance travelled by the web during acceleration and deceleration. In a preferred arrangement, therefore, the web is retracted after deceleration by an amount just sufficient to allow acceleration of the next image up to the speed of the stock at the application position. Thus, in a preferred arrangement the web is retracted so that the net distance travelled by the web during each cycle is substantially equal to (including only slightly exceeding) the length of an image on the web. Thus the spacing (i.e. of corresponding portions) of the images on the web need bear no relationship to the spacing of said positions on the stock. As noted, the web may carry a substantially continuous image, i.e. typically not having a significant repeat length: in that case it is particularly important that the net distance travelled by the web in excess of the length of an individual part of the image transferred be minimised in order to minimize waste of relatively expensive image material.

Preferably the web and the stock are pressed together to apply the images to the stock. The pressure is preferably applied only while the images and said positions on the stock are adjacent, so that at other times the web and stock may move at different speeds. Preferably the stock has adhesive ink patches applied at the predetermined positions in order to facilitate application of the images to the stock. Where a substantially continuous image is carried by the web the image part applied at each position may be determined by the adhesive patches: in other words, separation of an individual transferred image part from the web occurs where it is pressed on to the adhesive patch, thereby separating said part from the remaining image on the web. It has been found that using the adhesive patches in this way to define the transferred image, with no prior separation lines in the continuous image on the web, does produce images on the stock with sufficiently well-defined ends. Of course, as an alternative, the web may carry discrete images, where image parts to be transferred already have lines of separation (or spaces) between them on the web.

The invention is particularly applicable to the application of holographic images (holograms) to banknote sheets. Such images may be carried in the form of composite layers on plastics web from which they are readily transferred to suitably prepared areas (the predetermined positions) on the sheets. In a typical form the images comprise five alternate layers of leuconium oxide and silicon oxide carried on a web of PET (e.g. Mylar or Melinex). The image material is relatively expensive: it is also generally easier to apply to the web as a continuous layer (or layers). Even when discrete images are applied to the web it is impractical to attempt to space these at the distances required on the sheets. Hence it is preferred that the images are closely spaced (or continuous) on the web irrespective of their final spacing on the sheets.

The stock may comprise material in sheet or web form.

The invention extends to apparatus for performing the method of the invention. Preferably such apparatus includes independent drives for the carrier and for the stock. Typically the drive for the carrier comprises an electronically-controlled servo motor receiving timing pulses from the drive for the stock. The drive for the stock preferably comprises a constant speed motor.

Where the carrier is a web this may pass through an air mover upstream of the position at which the images are applied to the stock, the air mover being preferably capable of assisting retracting of the web. The web may pass through a region comprising a web reservoir upstream of the image applying position, the reservoir accumulating web during periods when the web is travelling at said lower speed. The reservoir may receive web moved in a reverse direction during retraction of the web. Suction means may be provided in the reservoir to assist retraction of the web. Linked drive leans (e.g. capstan rollers) may be provided at positions upstream and downstream of the image applying position, and may be arranged to control movement of the web (including movement of the web at said lower speed, and retraction of the web, where applicable).

Means for applying the images may comprise opposed cylinders which press the web and the stock together, the cylinders being arranged so that pressure is applied between the web and the stock only at positions corresponding to said predetermined positions on the stock where the images are to be applied. In this way the cylinders may be rotated at a constant speed corresponding to the speed of the stock, whereas the web may be moved at a different speed other than when an image is being applied. There may be several transversely spaced webs for applying separate images to transversely-spaced positions on the stock. Thus, for example, the stock may comprise sheets containing an array of, say, forty banknotes arranged in four transverse rows of ten. If it is required to apply an image to each banknote there would then be ten webs for applying images to the sheets. A common drive system may be provided for each of the webs, possibly with individual tensioning means for each web.

Where the web carries security images it is preferably fed from a cassette unit for application of the image to the stock and subsequently rewound on to a cassette unit after application. In this way security for unapplied images remaining on the used web is more easily maintained.

According to a further aspect, the invention provides a method of processing a web, comprising conveying the web past a processing position, periodically subjecting successive portions of the web to a process step including engagement of the web at said position, conveying at least said portion of the web at a predetermined speed during said process step, and conveying the web at a lower speed between process steps so that successive process steps are performed at substantially adjacent successive portions of the web.

The invention will be further described, by way of example only, with reference to the accompanying diagrammatic drawings, in which.

Figure 1:
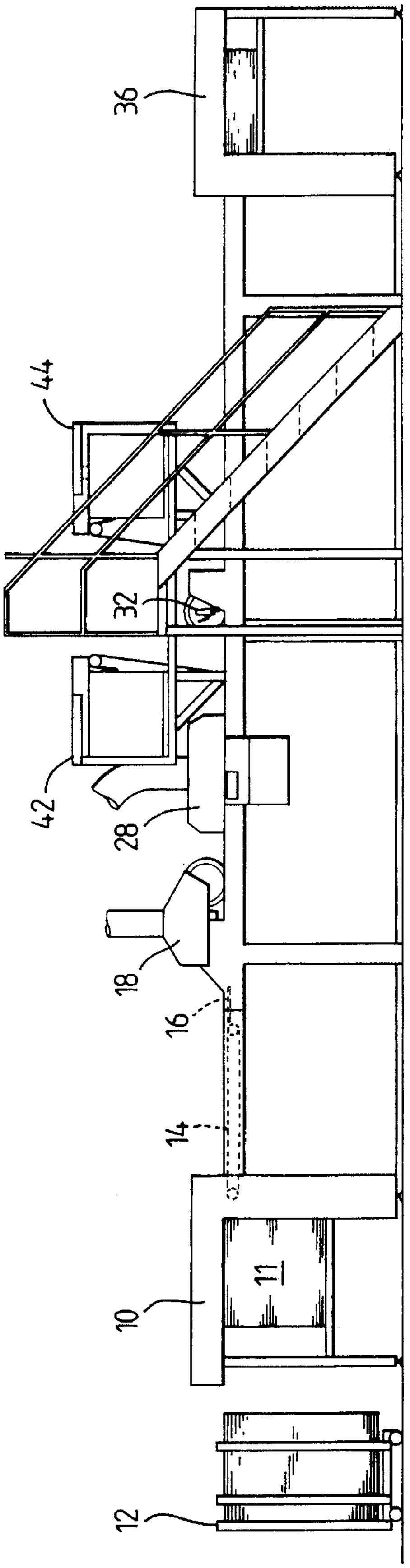
FIG. 1 is a side view of security printing apparatus.

Referring to FIG. 1, the security printing apparatus comprises a unit 10 for feeding successive sheets (13, FIG. 2) of banknote paper (which may be at least partially pre-printed) from a stack 11. The unit 10 is arranged for stack replenishment from a trolleyed. Individual sheets are conveyed from the feeding unit 10 by an outfeed belt 14 to a position where each sheet is engaged by a precision belt or chain conveyor 16 which carries a series of transverse bars (17, FIG. 2) incorporating individual sheet grippers. The grippers may be scissors type and spring-loaded, and may be activated at appropriate positions along the path of the conveyor 16 by cams mounted along each side of the path so that each sheet is gripped at its leading edge. The conveyor 16 carries the sheets 13 through the entire subsequent part of the apparatus, preferably at a constant speed, and maintains positional accuracy of individual sheets during subsequent processing. Sheets 13 may be given vertical restraint by laterally-spaced wires 19,21 which extend longitudinally along the operative runs of conveyor 16. Instead of the conveyor 16, any known conveyor for conveying individual sheets in well defined positions may be used.

Figure 2:
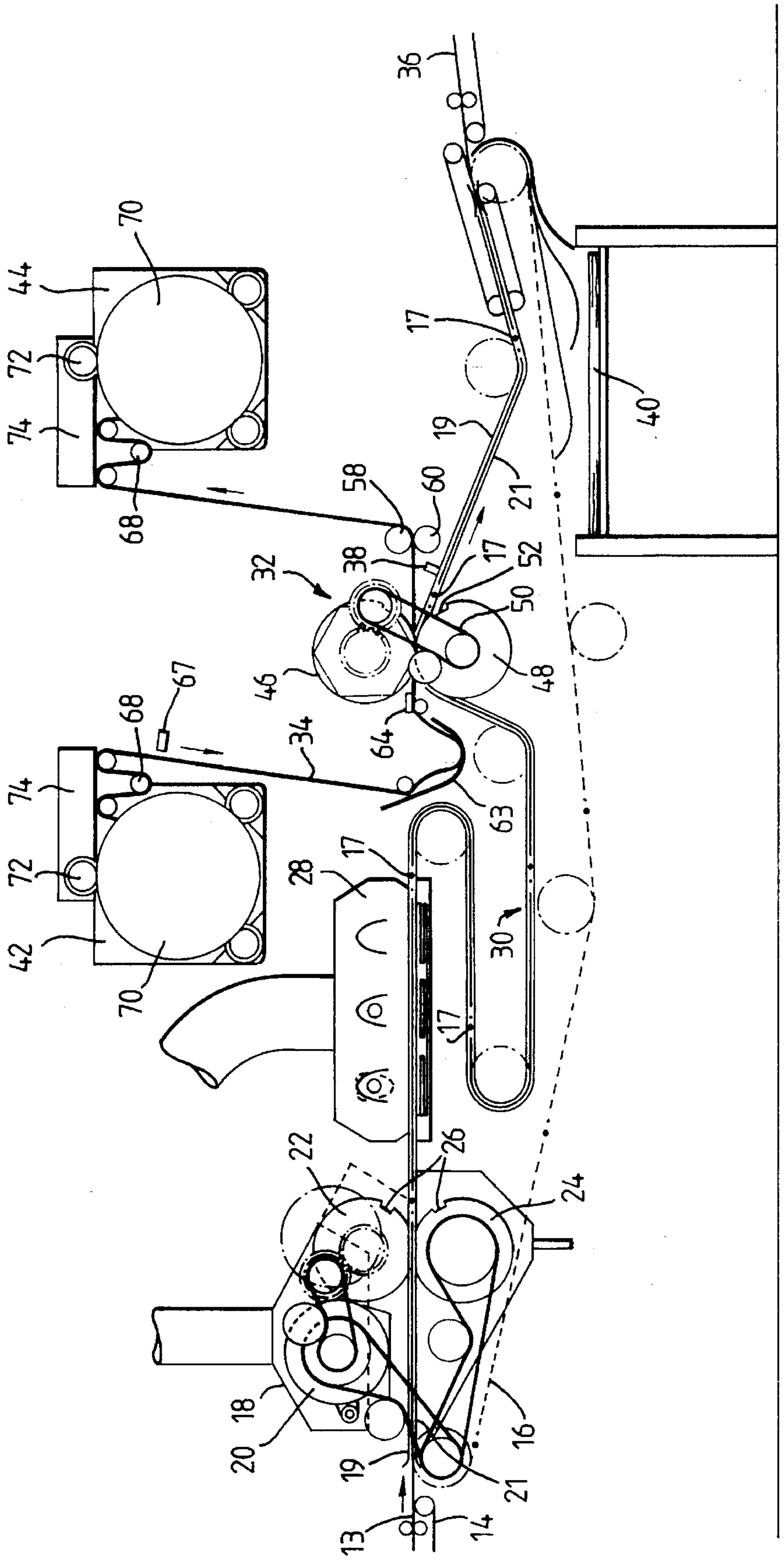
FIG. 2 is an enlarged side view of part of the apparatus of FIG. 1.

Referring also to FIG. 2, successive sheets 13 are moved by the conveyor 16 past a printing unit 18, which includes a gravure print cylinder 20, and offset cylinder 22 and an impression cylinder 24. The offset and impression cylinders 22, 24 each have cut-outs 26 in their peripheries to allow passage of the transverse bars 17 of the conveyor 16. The unit 18 is effective to apply a series of patches of adhesive ink to each sheet, e.g. one patch for each banknote on the sheet. Typically the unit 18 may apply patches in a pattern of ten transversely-spaced rows by four longitudinally-spaced patches (i.e. the gravure cylinder 20 has four circumferentially-spaced rows each of ten individual print patterns). Another possibility is an arrangement of eight transversely-spaced rows of five longitudinally-spaced patches.

Downstream of the print unit 18 the conveyor 16 carries the sheets through an ultra-violet radiation drying unit 28 and then along an extended path 30 between the drying unit and an applicator device 32, at which device individual pieces of thin film security material (i.e. carrying holographic images) are transferred from transversely-spaced carrying ribbons 34 on to the adhesive patches carried by the banknote sheets. Satisfactory sheets are subsequently conveyed by the conveyor 16 to a stacking unit 36. Faulty sheets (i.e. those having no or incorrectly applied thin film security material) are detected by a sensor 38 and caused to be diverted to a faulty sheet stack 40.

The thin film security material is carried on each ribbon 34 in the form of a continuous image separated into individual images (on transfer) by action of the adhesive patches. Alternatively, individual (separate) transferable images could be carried on each ribbon 34. The ribbons 34 are each conveyed from a cassette unit 42 to the applicator device 32 and then rewound (after transfer of the images to the banknote sheets) in a further cassette unit 44. The ribbons 34 typically comprise PET plastics material (e.g. Mylar or Melinex). Each of the units 42 and 44 includes a reel drive but speed of the ribbon 34 through the applicator device 32 is controlled by a servo motor capstan drive which is controlled by timing signals generated by an encoder carried by a suitable part of the drive for the conveyor 16. The reel drives therefore serve to maintain each ribbon 34 within an acceptable range of tensions.

Figure 3:
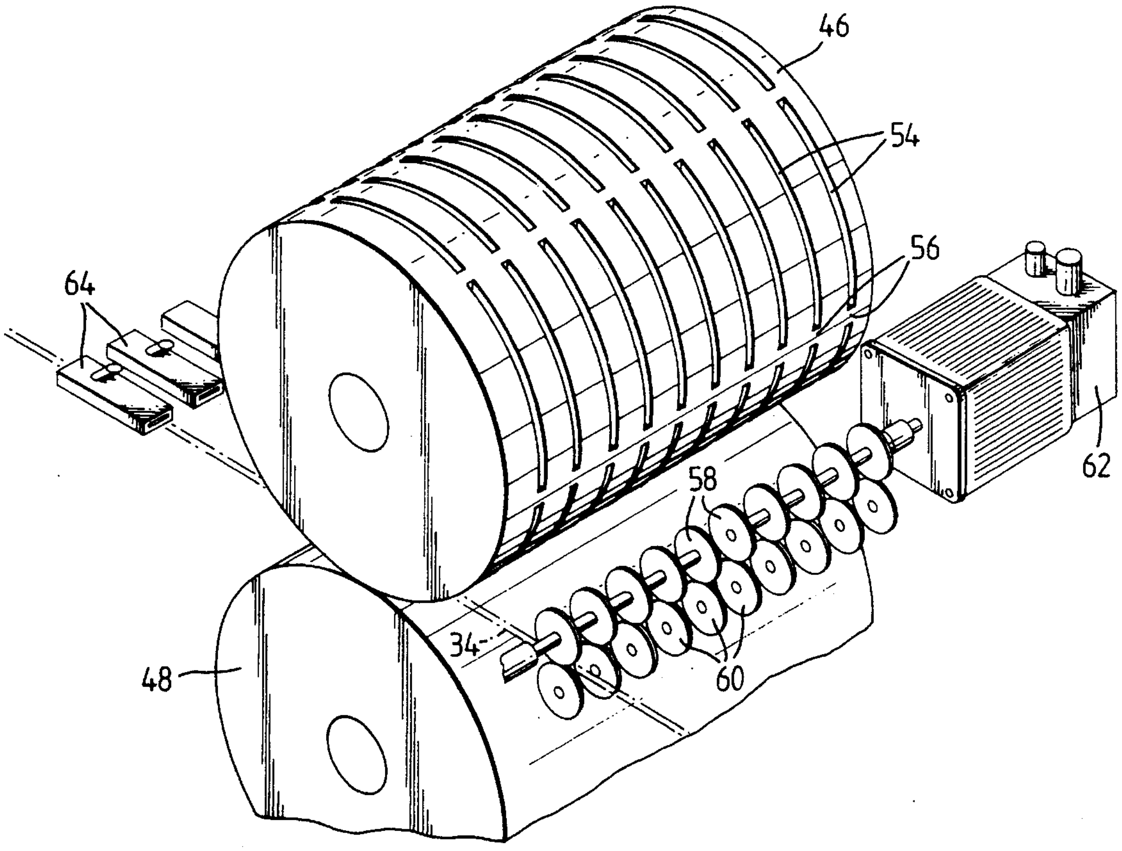
FIG. 3 is a further enlarged, perspective view of part of the apparatus of FIG. 1.

The device 32 comprises an upper steel cylinder 46 and a lower rubbercoated steel Cylinder 48. The cylinders 46 and 48 are synchronised with the conveyor 16 by means of a belt and gear drive 50. Each of the cylinders 46, 48 has a cut-out 52 to allow passage of the transverse bars 17 of the conveyor 16. As shown in FIG. 3, the upper cylinder 46 has a series of transversely and circumferentially spaced recesses 54. Each circumferential series of recesses 54 is aligned with the path of a ribbon 34 (i.e. there are ten such circumferential series). Within each circumferential series the recesses 54 are separated by bridge pieces 56: these bridge pieces correspond approximately in size and spacing to those of the adhesive patches on the banknote sheets. Hence the ribbons 34 are pressed on to the sheet between the drums 46 and 48 only while the adhesive patches and corresponding images (i.e. portions of the continuous images, comprising transferable pieces of the thin film security material) on the ribbons are aligned.

As also shown in FIG. 3, the ribbons 34 are driven by upper and lower capstans 58, 60. In the illustrated arrangement the upper capstans 58 are arranged in two series of five, each being driven by a side-mounted servo motor 62 (only one of which is shown): in alternative arrangements there could be a single motor driving all the upper capstans 58, or more than two motors for these capstans.

It will be noted that the positions of the bridge pieces 56, corresponding to those of the adhesive patches, are relatively widely spaced in the circumferential direction relative to the roller 46. The images on the ribbon 34 could be similarly spaced so that the motor 62 would run at a relatively constant speed with the ribbons 34 having a linear speed corresponding to that of the sheets conveyed by the conveyor 16. However, as previously noted, it is preferred to arrange for the images on the ribbons to be closely adjacent. Hence, the motor 62 in effect indexes the images into position between the cylinders 46 and 48. It will be appreciated, however, that for successful application of the images the ribbons 34 should be travelling at the same speed as the banknote sheets at the instant that they are pressed onto the sheets by the bridge pieces 56. In order to achieve this the control for the motors 62 causes the ribbons to be rapidly accelerated from rest up to the speed of the sheets and subsequently decelerated again. It will be further appreciated that although the acceleration and deceleration may be relatively rapid the length of each ribbon 34 conveyed by the capstans 58, 60 during each cycle needs to exceed the length of the image to be applied in order to allow for the acceleration before the image reaches the speed of the sheets and for the deceleration back to rest. Clearly it would be possible to space the images on the ribbon by an amount which allows for such acceleration and deceleration, but, for reasons already mentioned, it is preferred to reverse the drive to motor 62 and capstans 58, 60 so that the ribbons are retracted between each application of an image, and so that the net advance of the ribbons during each cycle only slightly exceeds (e.g. by 0.25 mm) the length of an image. It will be appreciated that since the ribbons are in contact with the upper cylinder 46 only at the bridge pieces 56 and normally pass through time slots 54, such retraction is not impeded by the cylinders 46, 48.

In order to ensure that the lengths of ribbons 34 extending past the cylinders 46, 48 are maintained relatively taut, and to encourage retraction during reversal of the drive to the capstans 58, each ribbon passes through an air mover 64 which continually imposes a relatively light conveying force away from the rollers 46, 48. This force is easily overcome by the drive of the capstans 58 during advancement of the ribbons 34 but is sufficient to retract the ribbons during reversal of the drive. Suitable air movers are disclosed in British patent specification No. 2226538A, to which reference is directed for details. A ribbon reservoir 63 (FIG. 2) arranged upstream of the air mover 64 receives ribbon 34 retracted beyond the air mover.

As previously mentioned, the motor 62 receives timing signals from a shaft encoder associated with the drive for the sheet conveyor 16. Although it was also previously mentioned that the bridge pieces 56 on the upper cylinder 46 correspond in spacing and size to that of the adhesive patches on the banknote sheets they may exceed these in size somewhat, thereby providing a tolerance for drift in the position of the adhesive patches on the sheets.

The transfer load between the cylinders 46 and 48 is imposed by a pair of pneumatic cylinders at the sides of the cylinders. The compression load can be pre-set by setting the supply pressure to these cylinders. The lower cylinder 48 is driven directly by the chain conveyor 16. The upper cylinder 46 is driven from the lower cylinder by a gear chain or toothed belt forming part of the drive 50.

The drive arrangement to the ribbons 34 is readily able to deal with any splices in the ribbons. By detecting the beginning and end of the spliced patch (e.g. by means of a photodetector 67), a decision can be made (e.g. by a control microprocessor) on when to increase the ribbon increment and by how much so as to minimise wastage of the thin film security material carried by the ribbons.

Each reel in unit 42 may contain sufficient material to cope with one complete seven hour shift at 100% efficiency. In this way the necessity for automatic splicing is avoided, thereby simplifying the machine. Any material remaining on the machine at the end of each shift could be returned within the reel unit 42 to a refurbishing centre. With this arrangement typical reel diameter would be 400 mm (for 3,750 metres of ribbon) and a typical weight of the unit 42 would be 70 kg.

Alternatively the reels contained in unit 42 may be somewhat smaller, e.g. with enough material for half a shift, and an automatic splicing arrangement provided. With such an arrangement the diameter of the reel would be about 300 mm and the weight of the unit 42 about 40 kg. In either case it will be seen that closely spacing the transferable images on the ribbons 34 is advantageous.

Tension in the ribbon 34 is controlled by individually driving each of the reels of ribbon by small inexpensive d.c. electric motors. The ribbons 34 run over rollers 68 on a sprung arm to which is attached a potentiometer. The output of the potentiometer controls motor torque, thereby achieving closed loop tension control. The reels are contained in the units 42, 44 within cassettes 70, and the electric drives are connected via bevelled gears to rubber rollers 72 which engage directly with the outer circumference of the cassettes to rotate them. To facilitate ease of changeover of cassettes 70 the motors and associated ribbon rollers 68, 72 etc. are carried on a swinging arm 74 which may be swung clear of the cassettes when required.

Figure 4:
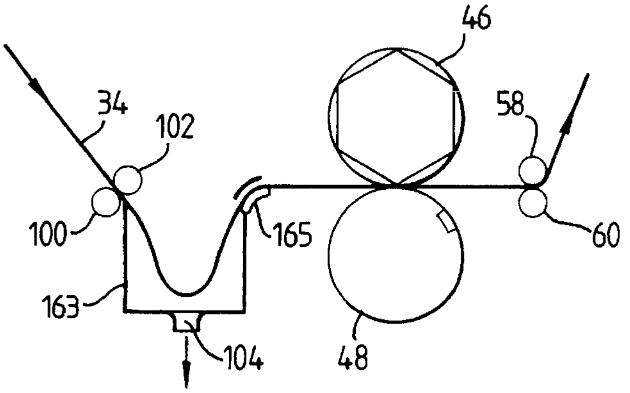
FIG. 4 is an enlarged view of part of a modification of the apparatus of FIG. 1.

FIG. 4 shows an alternative arrangement for providing retraction of the ribbons 34. A modified ribbon reservoir 163 is located upstream of the cylinders 46, 48. At its downstream edge the reservoir 163 has an air bearing 165. Capstan rollers 100, 102 feed the ribbon 34 into the reservoir 163 (at the average rate of consumption of the ribbon). A loop of ribbon 34 formed in the reservoir 163 is subjected to suction generated by a suction manifold 104 in the base of the reservoir. The effect of this is that when drive to the capstans 58, 60 is reversed so as to allow retraction of the ribbons 34 the suction acting on the ribbons in the reservoir 163 ensures retraction of the ribbons between the cylinders 46, 48. The reservoir 163 thus performs the function of the air mover 64 in FIG. 1. Of course, the air bearing 165 could generate a component of movement tending to cause retraction of the ribbons 34 and thus assist suction generated in the reservoir 163 (i.e. the air bearing 165 could partly have the function of an air mover).

Figure 5:
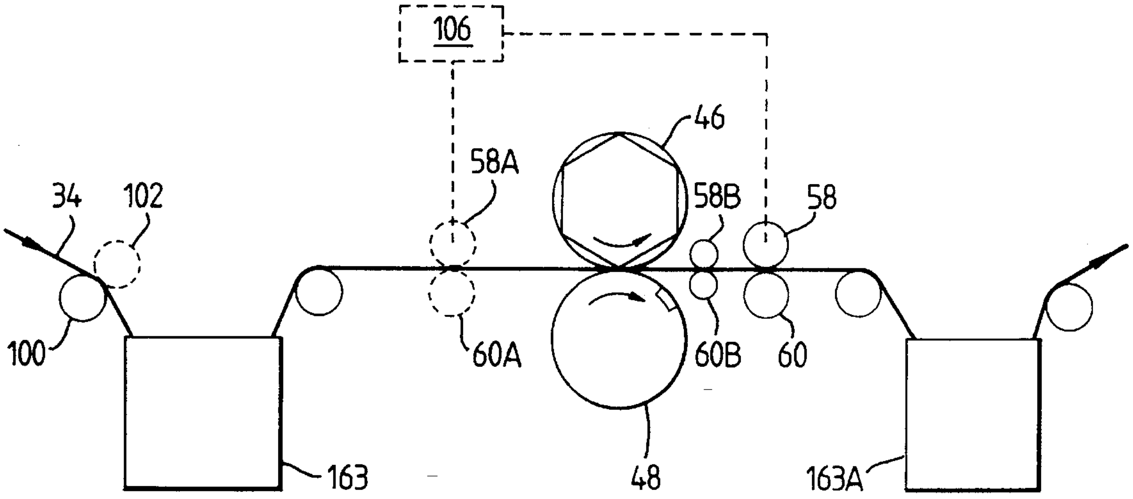
FIG. 5 is an enlarged view of part of another modification of the apparatus of FIG. 1.

FIG. 5 shows a different arrangement for causing retraction of the ribbons 34. A reservoir 163A, similar to the reservoir 163, is provided, so that tension is controlled downstream and upstream of the print cylinders 46,48 by the reservoirs 163,163A. Each of the reservoirs 163, 163A may include a suction manifold 104. Additionally, or alternatively, capstan rollers 58A, 60A may be arranged upstream of the cylinders 46, 48. A common drive 106 is provided for the rollers 58, 60 and 58A, 60A. Feed capstan rollers 100, 102 are provided upstream of the capstan rollers 58A, 60A. In this arrangement, when it is required to retract ribbons 34 the drive 106 is reversed so that rollers 58A, 60A ensure that ribbons are drawn in the reverse direction past the cylinders 46, 48. The reservoir 163 receives portions of ribbons 34 retracted by the rollers 58A, 60A (and possibly, in addition, portions of ribbons which continue to be advanced by rollers 100, 102). During normal advancement of ribbons 34 past the cylinders 46, 48 the drive 106 causes both sets of rollers 58, 60 and 58A, 60A to rotate at the same rate.

In the arrangement as shown in FIG. 5, in order to maintain tension in the web 34 just downstream of the cylinders 46,48 following a printing operation and when the capstans 58,60 are decelerating, it may be necessary to provide a supplementary drive to the web 34 for a relatively short period to ensure that the web tension is sufficient to separate it from the printed sheets which remain on the cylinder 48: a preferred way of achieving this supplementary drive comprises rotary eccentric rollers 58B, 60B which engage the web in a nip formed between them briefly during each revolution. Drive for the rollers 58B,60B may be independent or derived from the drive 106.

We claim:

1. Apparatus for applying a series of images to a moving stock, comprising: means for conveying a carrier web, said web carrying transferable images; means for conveying a stock to which the images are to be applied; means for advancing the stock at a controlled speed; means for advancing the web at a variable speed by alternately accelerating and decelerating the web in successive cycles; and means for transferring the images to predetermined positions of the stock; said web advancing means including means for moving the web at the speed of the stock while images are being transferred and means for moving the web at a lower speed at other times so as to reduce net travel of the web between successive transferring steps, said moving means including means for reversing motion of the web, wherein said reversing means is arranged to move the web in each cycle through a distance corresponding to that advanced during acceleration to and deceleration from the speed of the stock, whereby the net distance travelled by the web in each cycle is substantially equal to the repeat length of the image; and wherein the web advancing means is arranged to withdraw the web from a reservoir in which, during advancement and reversal, the web is maintained under controlled tension by pneumatic means.

2. Apparatus as claimed in claim 1, including an air mover at the downstream side of the reservoir and arranged to urge the web in a direction into the reservoir.

3. Apparatus as claimed in claim 1, wherein the web reservoir is provided with suction for drawing the web into the reservoir.

4. Apparatus as claimed in claim 3, wherein the web reservoir comprises a chamber having an opening through which the web extends in the form of a loop, and suction means acting on the loop on its side remote from the opening.

5. Apparatus as claimed in claim 1, wherein pneumatic tensioning means is provided for the web downstream of the transferring means.

6. A method for applying a series of images to a moving stock, comprising the steps of: conveying a carrier web, said web carrying transferable images; conveying a stock to which the images are to be applied; advancing the stock at a controlled speed; advancing the web at a variable speed by alternately accelerating and decelerating the web in successive cycles; and transferring the images to predetermined positions of the stock; said web advancing including moving the web at the speed of the stock while images are being transferred, moving the web at a lower speed at other times so as to reduce net travel of the web between successive transferring steps, and reversing motion of the web so as to move the web in each cycle through a distance corresponding to that advanced during acceleration to and deceleration from the speed of the stock, whereby the net distance travelled by the web in each cycle is substantially equal to the repeat length of the image; and wherein the web advancing further includes withdrawing the web from a reservoir in which, during advancement and reversal, the web is maintained under controlled tension by pneumatic means.

7. An apparatus for applying a series of images to a moving stock, comprising: means for conveying the images on a carrier web, the images having corresponding portions at a first spacing on the carrier web: means for transferring the images from the carrier web to predetermined positions on the moving stock, the images having corresponding portions at a second spacing on the stock, said second spacing being greater than said first spacing; means for controlling said conveying means in successive application cycles to control movement of the carrier Web at the same speed as the stock during transfer, but at a lower speed between transferring, so as to reduce net travel of the carrier between transferring, and to reverse the motion of the carrier web between each transferring of images to said moving stock by said transferring means, said controlling means including carrier web driver means arranged downstream of said transferring means for driving said conveying means and pneumatic means arranged upstream of said transferring means for assisting in the reversal of the carrier web; and a web reservoir through which the carrier web passes upstream of the transferring means for accumulating carrier web during reverse movement thereof.

8. An apparatus as claimed in claim 7, wherein said controlling means includes means for accelerating the carrier web from rest up to the speed of the stock and decelerating the carrier web back to rest between each transferring.

9. An apparatus as claimed in claim 7, wherein the net travel of the carrier web during each application cycle is substantially equal to the length of the image transferred during the cycle.

10. An apparatus as claimed in claim 7, wherein the images comprise portions of a substantially continuous image carried by said carrier web.

11. An apparatus as claimed in claim 7, wherein the images comprise discrete images carried by said carrier web.

12. An apparatus as claimed in claim 7, wherein said transferring means includes means for cyclically pressing the carrier and stock together.

13. An apparatus as claimed in claim 12, further including means for applying adhesive patches to the stock at said predetermined positions.

14. An apparatus as claimed in claim 13, wherein the images include holographic images.

15. An apparatus for processing a web, comprising means for conveying the web in a conveying direction past a processing position at a variable speed by alternately accelerating and decelerating the web in successive cycles; and means for periodically subjecting successive portions of the web to a process step including engagement of the web at said position; said conveying means including means for controlling movement of the web (a) to accelerate said web to convey at least said portion of the web at a predetermined speed during said process step, (b) to decelerate the web and reverse the motion of the web after completion of a process step so as to move the web in a direction reverse to the conveying direction through a distance corresponding to that advanced during acceleration and deceleration, and then (c) to convey the web in the conveying direction at a lower speed than said predetermined speed between process steps so that successive process steps are performed at substantially adjacent successive portions of the web.

16. An apparatus as claimed in claim 15, wherein said conveying means includes pneumatic means upstream of said process step subjecting means for assisting in the reverse motion of the web between process steps.

17. An apparatus as claimed in claim 15, wherein the process step includes applying pressure between the web and at least one conveyor moving at said predetermined speed.

18. An apparatus as claimed in claim 17, wherein the web passes between a nip between rollers at said processing position.

19. An apparatus as claimed in claim 15, wherein the web comprises at least one splice, and further including means for detecting the splice upstream of said processing position and for controlling said conveying means to convey the splice past said processing position between successive processing steps.

20. An apparatus as claimed in claim 15, wherein said processing step includes transferring images carried by said web onto a moving stock.

21. Apparatus as claimed in claim 1, wherein the stock advancing means and the web advancing means respectively comprise independent drive means, the relative synchronization of which is achieved by electronic timing signals.

22. Apparatus as claimed in claim 1, including means for cyclically applying pressure to the web and stock to effect transfer of the images.

23. Apparatus as claimed in claim 15, wherein the pressure applying means includes a cylinder having a circumferential region including at least one relatively raised land for applying said pressure and at least one recess through which the web may pass.

24. Apparatus as claimed in claim 1, wherein said means for conveying a carrier web includes means for conveying a plurality of laterally-spaced carrier webs, and said transferring means includes means for transferring laterally-spaced images substantially simultaneously to the stock.

25. Apparatus as claimed in claim 1, wherein the web advancing means includes supplementary means engaging the web during part of each cycle only and arranged to encourage separation of the web and stock immediately after transfer of an image.

26. Apparatus as claimed in claim 1, wherein the stock conveying means includes means for locating individual sheets, and wherein the web advancing means is controlled by timing signals derived from the stock advancing means.

27. Apparatus as claimed in claim 12, including means for detecting a splice in a web, and for controlling the web advancing means so that the spliced part of the web is conveyed past the transferring means between successive transfer steps.

28. Apparatus as claimed in claim 1, wherein the means for conveying the carrier web comprises means for delivering the web from a cassette and for returning the web to a cassette after transfer of images.

* * * * *

UNITED STATES PATENT AND TRADEMARK OFFICE

CERTIFICATE OF CORRECTION

PATENT NO. : 5,618,378
DATED : Apr. 8, 1997
INVENTOR(S) : CAHILL, et al

It is certified that error appears in the above-indentified patent and that said Letters Patent is hereby corrected as shown below:

On the title page:

Please correct [75] Inventor as follows:

--[75] Inventor(s): Michael John CAHILL; David Robert SEAWARD; both of Coventry, England--

Signed and Sealed this
Seventh Day of October, 1997

Attest:

Bruce Lehman

BRUCE LEHMAN

*Attesting Officer* *Commissioner of Patents and Trademarks*